US012657847B2

(12) United States Patent
Long

(10) Patent No.: US 12,657,847 B2
(45) Date of Patent: Jun. 16, 2026

(54) METHOD, ELECTRONIC DEVICE AND STORAGE MEDIUM FOR IMAGE PROCESSING

(71) Applicant: Beijing Zitiao Network Technology Co., Ltd., Beijing (CN)

(72) Inventor: Hua Long, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 138 days.

(21) Appl. No.: 18/695,813

(22) PCT Filed: Sep. 6, 2022

(86) PCT No.: PCT/CN2022/117167
§ 371 (c)(1),
(2) Date: Mar. 26, 2024

(87) PCT Pub. No.: WO2023/051185
PCT Pub. Date: Apr. 6, 2023

(65) Prior Publication Data
US 2025/0131667 A1      Apr. 24, 2025

(30) Foreign Application Priority Data

Sep. 29, 2021    (CN) .......................... 202111151627.3

(51) Int. Cl.
*G06T 19/00*        (2011.01)
*G06T 3/40*         (2024.01)
*G06T 19/20*        (2011.01)
(52) U.S. Cl.
CPC .............. *G06T 19/006* (2013.01); *G06T 3/40* (2013.01); *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

2014/0247281 A1* 9/2014 Ellenby ................ G06T 19/006
                                                345/633
2016/0180590 A1* 6/2016 Kamhi .................. G06T 19/006
                                                345/633
(Continued)

FOREIGN PATENT DOCUMENTS

CN      101021952 A      8/2007
CN      104394313 A      3/2015
(Continued)

OTHER PUBLICATIONS

Weng, Chung-Yi, Brian Curless, and Ira Kemelmacher-Shlizerman. "Photo wake-up: 3d character animation from a single photo." Proceedings of the IEEE/CVF conference on computer vision and pattern recognition. 2019. (Year: 2019).*
(Continued)

*Primary Examiner* — Ryan M Gray

(57) ABSTRACT

The application discloses a method, electronic device, and storage medium for image processing, which includes: in response to determining that the trigger of an effect display function is detected, adding a virtual model to a collected image to be processed to obtain a presentation video frame; magnifying-displaying an image area of the virtual model in the presentation video frame, and processing the virtual model into a target three-dimensional effect model in response to determining that a magnification stop condition is reached; fusing the target three-dimensional effect model and a target object in the image to be processed to present a target video frame.

20 Claims, 4 Drawing Sheets

IN RESPONSE TO DETERMINING THAT THE TRIGGER OF AN EFFECT DISPLAY FUNCTION IS DETECTED, ADD A VIRTUAL MODEL TO A COLLECTED IMAGE TO BE PROCESSED TO OBTAIN A PRESENTATION VIDEO FRAME ⟶ S110

MAGNIFYING-DISPLAY AN IMAGE AREA OF THE VIRTUAL MODEL IN THE PRESENTATION VIDEO FRAME, AND PROCESS THE VIRTUAL MODEL INTO A TARGET THREE-DIMENSIONAL EFFECT MODEL IN RESPONSE TO DETERMINING THAT A MAGNIFICATION STOP CONDITION IS REACHED ⟶ S120

FUSE THE TARGET THREE-DIMENSIONAL EFFECT MODEL AND A TARGET OBJECT IN THE IMAGE TO BE PROCESSED TO PRESENT A TARGET VIDEO FRAME ⟶ S130

(56) References Cited

U.S. PATENT DOCUMENTS

| | | | |
|---|---|---|---|
| 2020/0035025 A1* | 1/2020 | Crocker | G06T 19/006 |
| 2020/0074705 A1* | 3/2020 | Berger | G06V 20/10 |
| 2020/0372723 A1* | 11/2020 | Komissarov | G06T 19/20 |
| 2021/0004595 A1* | 1/2021 | Du | H04N 23/611 |
| 2021/0084233 A1* | 3/2021 | Faaborg | G06F 3/0425 |
| 2021/0118236 A1* | 4/2021 | Hou | A63F 13/428 |
| 2022/0004250 A1* | 1/2022 | Yasuda | G06F 3/0484 |
| 2022/0270330 A1* | 8/2022 | Kondo | G06F 3/01 |
| 2023/0162452 A1* | 5/2023 | Lu | G06T 19/20 |
| | | | 345/419 |
| 2024/0013498 A1* | 1/2024 | Sato | G06V 40/107 |

FOREIGN PATENT DOCUMENTS

| | | |
|---|---|---|
| CN | 109215101 A | 1/2019 |
| CN | 109727303 A | 5/2019 |
| CN | 109803165 A | 5/2019 |
| CN | 111225231 A | 6/2020 |
| CN | 111526412 A | 8/2020 |
| CN | 111565332 A | 8/2020 |
| CN | 111880709 A | 11/2020 |
| CN | 111935491 | 11/2020 |
| CN | 112333491 A | 2/2021 |
| CN | 112544070 A | 3/2021 |
| CN | 112732152 A | 4/2021 |
| CN | 113453034 A | 9/2021 |
| CN | 113850746 A | 12/2021 |
| CN | 113850746 B | 11/2024 |

OTHER PUBLICATIONS

Bin, "Production and operation of new media audio-visual works", Classical textbooks of journalism and communication, 2020, pp. 1-14.

Huang et al., "Exhibition industry economics", Sichuan University History Series Excellent Textbooks, Apr. 2021, pp. 1-10.

Office action received from Chinese patent application No. 202111151627.3 mailed on Mar. 13, 2024, 25 pages (14 pages English Translation and 11 pages Original Copy).

Zheng, "Movies and TV programs Director and production", Practical teaching materials, Jul. 2021, pp. 1-20.

Notice of Allowance for Chinese Application No. 202111151627.3, mailed Oct. 21, 2024, 8 pages.

Decision of Reexamination for Chinese Application No. 202111151627.3, mailed Oct. 8, 2024, 2 Pages.

Office action received from Chinese patent application No. 202111151627.3 mailed on Oct. 28, 2023, 17 pages (6 pages English Translation and 11 pages Original Copy).

* cited by examiner

| IN RESPONSE TO DETERMINING THAT THE TRIGGER OF AN EFFECT DISPLAY FUNCTION IS DETECTED, ADD A VIRTUAL MODEL TO A COLLECTED IMAGE TO BE PROCESSED TO OBTAIN A PRESENTATION VIDEO FRAME | S110 |

| MAGNIFYING-DISPLAY AN IMAGE AREA OF THE VIRTUAL MODEL IN THE PRESENTATION VIDEO FRAME, AND PROCESS THE VIRTUAL MODEL INTO A TARGET THREE-DIMENSIONAL EFFECT MODEL IN RESPONSE TO DETERMINING THAT A MAGNIFICATION STOP CONDITION IS REACHED | S120 |

| FUSE THE TARGET THREE-DIMENSIONAL EFFECT MODEL AND A TARGET OBJECT IN THE IMAGE TO BE PROCESSED TO PRESENT A TARGET VIDEO FRAME | S130 |

FIG. 1

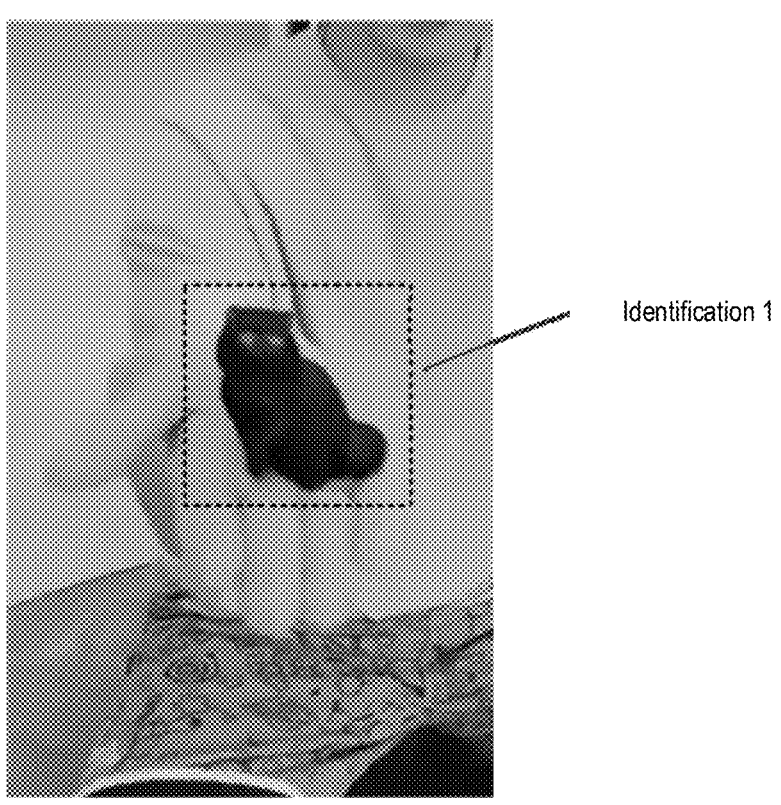

Identification 1

FIG. 2

Identification 1

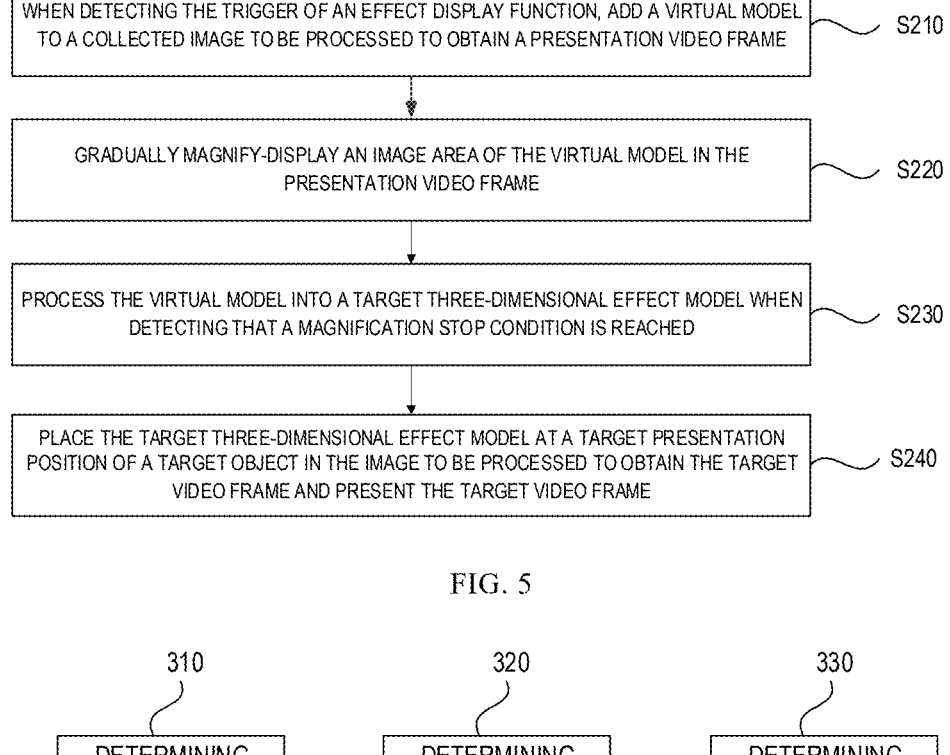

WHEN DETECTING THE TRIGGER OF AN EFFECT DISPLAY FUNCTION, ADD A VIRTUAL MODEL TO A COLLECTED IMAGE TO BE PROCESSED TO OBTAIN A PRESENTATION VIDEO FRAME          S210

GRADUALLY MAGNIFY-DISPLAY AN IMAGE AREA OF THE VIRTUAL MODEL IN THE PRESENTATION VIDEO FRAME          S220

PROCESS THE VIRTUAL MODEL INTO A TARGET THREE-DIMENSIONAL EFFECT MODEL WHEN DETECTING THAT A MAGNIFICATION STOP CONDITION IS REACHED          S230

PLACE THE TARGET THREE-DIMENSIONAL EFFECT MODEL AT A TARGET PRESENTATION POSITION OF A TARGET OBJECT IN THE IMAGE TO BE PROCESSED TO OBTAIN THE TARGET VIDEO FRAME AND PRESENT THE TARGET VIDEO FRAME          S240

| DETERMINING MODULE OF PRESENTATION VIDEO FRAME | DETERMINING MODULE OF THREE-DIMENSIONAL EFFECT | DETERMINING MODULE OF TARGET VIDEO FRAME |

FIG. 6

METHOD, ELECTRONIC DEVICE AND STORAGE MEDIUM FOR IMAGE PROCESSING

CROSS-REFERENCE TO RELATED APPLICATION(S)

This application claims priority to Chinese patent application No. 202111151627.3 filed with the Chinese Patent Office on Sep. 29, 2021, the disclosures of which are incorporated herein by reference in their entities.

FIELD

Embodiments of the present disclosure relate to the technical field of image processing, for example, to a method, apparatus, electronic device and storage medium for image processing.

BACKGROUND

With the development of network technology, more and more applications have entered users' lives, such as a series of software that can capture short videos, which are deeply loved by users.

Currently, when capturing corresponding videos or images based on software for capturing short videos, some effects processing is often performed to improve the interest of the video. However, the effects in the related art have such problems as lacking abundant content and relatively single display, resulting in poor view and usage experience for users.

SUMMARY

The present disclosure provides a method, apparatus, electronic device and storage medium for image processing to achieves the richness and interestingness of video shooting content, thereby improving the technical effect of user experience.

In a first aspect, embodiments of the present disclosure provide a method for image processing, the method comprising:

in response to determining that the trigger of an effect display function is detected, adding a virtual model to a collected image to be processed to obtain a presentation video frame;

magnifying-displaying an image area of the virtual model in the presentation video frame, and processing the virtual model into a target three-dimensional effect model in response to determining that a magnification stop condition is reached;

fusing the target three-dimensional effect model and a target object in the image to be processed to present a target video frame.

In a second aspect, embodiments of the present disclosure provide an apparatus for image processing, the apparatus comprising:

a determining module of presentation video, configured for in response to determining that the trigger of an effect display function is detected, adding a virtual model to a collected image to be processed to obtain a presentation video frame;

a determining module of three-dimensional effect, configured for magnifying-displaying an image area of the virtual model in the presentation video frame, and processing the virtual model into a target three-dimensional effect model in response to determining that a magnification stop condition is reached;

a determining module of target video frame, configured for fusing the target three-dimensional effect model and a target object in the image to be processed to present a target video frame.

In a third aspect, embodiments of the present disclosure provide electronic device, comprising:

one or more processors;

a storage device configured for storing one or more programs, when the one or more programs are executed by the one or more processors, causing the one or more processors to implement the image processing method according to any method for image processing according to the embodiments of the present disclosure.

In a fourth aspect, embodiments of the present disclosure provide storage medium comprising computer-executable instructions, the computer-executable instructions, when executed by a computer processor, being configured to perform any method for image processing according to the embodiments of the present disclosure.

BRIEF DESCRIPTION OF THE DRAWINGS

FIG. 1 is a schematic flowchart of a method for image processing provided by an embodiment of the present disclosure;

FIG. 2 is a schematic diagram of adding virtual effects to an image to be processed provided by an embodiment of the present disclosure;

FIG. 5 is a schematic flowchart of a method for image processing provided by a further embodiment of the present disclosure;

FIG. 6 is a schematic structural diagram of an apparatus for image processing provided by a further embodiment of the present disclosure;

DETAILED DESCRIPTION

Figure 3:
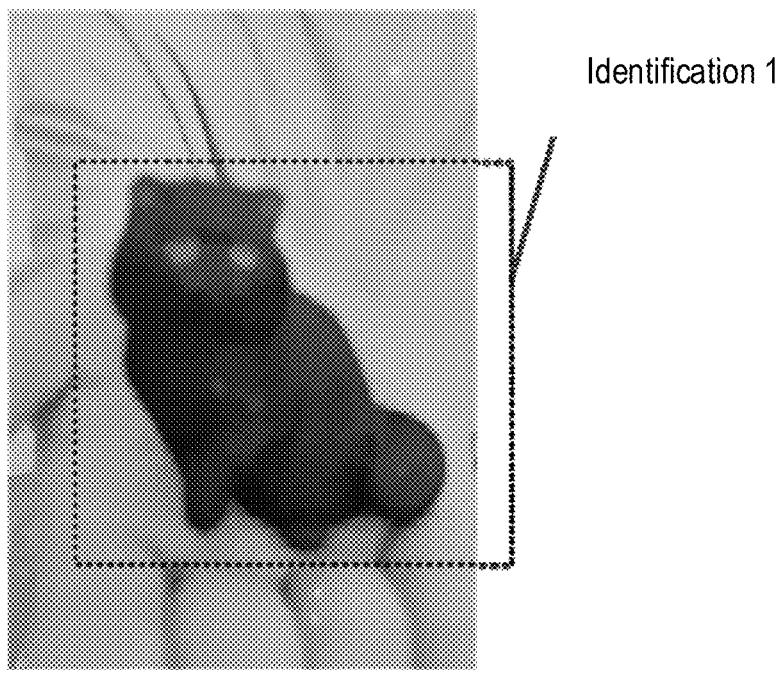
FIG. 3 is a schematic diagram of magnifying an image area corresponding to the virtual effect provided by an embodiment of the present embodiment.

It should be understood that multiple steps described in the method implementation manners of the present disclosure may be executed in different orders and/or in parallel. In addition, the method implementation manners may include additional steps and/or omit the steps shown. The scope of this disclosure is not limited in this regard.

The term "including" and its variations used in this article are open-ended, i.e., "including but not limited to". The term "based on" refers to "based at least in part on". The term "one embodiment" refers to "at least one embodiment"; the term "another embodiment" refers to "at least one additional embodiment"; and the term "some embodiments" refers to "at least some embodiments". Relevant definitions of other terms will be given in the following description.

It should be noted that the concepts of "first" and "second" mentioned in the present disclosure are only used to distinguish different devices, modules, or units, and are not intended to limit the order or interdependence of the functions performed by these devices, modules, or units. It should be noted that the modifications of "one" and "multiple" mentioned in this disclosure are illustrative and not restrictive. Those skilled in the art should understand that unless otherwise specified in the context, they should be understood as "one or more".

The names of the messages or information exchanged between multiple devices in this public implementation are for illustrative purposes only and are not intended to limit the scope of these messages or information.

Before introducing this technical solution, an exemplary description of the application scenario may be first presented. The technical solution disclosed herein can be applied to any scenario of capturing and playing a video. For example, in a video call, the effects disclosed in this technical solution can be added to call users; or in live streaming, the effects disclosed in this technical solution can be added to the live streamer; of course, it can also be applied in the process of short video capturing, and the technical solution disclosed herein can be implemented during the process of capturing a captured object.

FIG. 1 is a schematic flowchart of a method for image processing method provided by an embodiment of the present disclosure. The embodiments of the present disclosure are applicable to any scenario of video presentation supported by the Internet, for adding effects to a target object during video capturing, and then presenting video frames including effects. The method can be performed by an image processing apparatus, which can be implemented in the form of software and/or hardware. For example, it is implemented by an electronic device, which can be a mobile terminal, a PC or a server, etc. Any scenario of image presentation is usually implemented through cooperation of a client and a server. The method provided in this embodiment can be performed by a server, a client, or cooperation of a client and a server.

S110: when the trigger of an effect display function is detected, a virtual model is added to a collected to-be-processed image to obtain a presentation video frame.

It is noteworthy that a brief illustration has been presented to various application scenarios, which will not be elaborated here.

It is further noteworthy that an apparatus for performing the image processing method provided in the present disclosure can be integrated into application software that supports image processing functions, and the software can be installed in an electronic device. For example, the electronic device can be a mobile terminal or a PC. The application software can be a type of software for image/video processing, and the specific application software will not be repeated here, as long as the image/video processing can be realized.

During the process of users capturing short videos, live streaming, etc., a display interface can include target objects and buttons for adding effects. When the user triggers the effect button, at least one effect to be added can pop up, and the user can select one of multiple effects to be added as a target effect. Or, when a control corresponding to the trigger of the effect is detected, the server can determine to add the corresponding effect to the object in the screen shot. The image to be processed can be an image collected based on application software. In specific application scenarios, the image to be processed can be collected in real time or periodically. For example, in a live streaming scene or a video capturing scene, the camera device collects images including the target object in the target scene in real time. At this time, the image collected by the camera device can be used as the image to be processed. The virtual model can be an added model, which can be a virtual model corresponding to the effect to be displayed. For example, if the effect to be displayed is a cat, and the color of the cat is black, then the virtual model can be an augmented reality (AR) effect model corresponding to black big cats, with reference to the content with an identification 1 in FIG. 2. The virtual model may be added at any position in the image to be processed. The image to be processed with the added effect model can be used as a presentation video frame.

It is noteworthy that in a video capturing scene, a video frame corresponding to the trigger of an effect display function can be used as the image to be processed. During the video capturing process, a virtual model is added to the image to be processed to obtain the presentation video frame.

For example, in scenes of short video capturing, video calls, or live streaming, users can trigger the button to add effects on the display interface, i.e., triggering the effects display function. At this time, a plurality of effects to be added can be displayed, and users can determine one from the plurality of effects to be added. After determining the effect, the image corresponding to the trigger of the effects display function can be used as the image to be processed, and the virtual model corresponding to the effect can be added to the image to be processed to obtain the presentation video frame.

S120: displaying a magnified image area of the virtual model in the presentation video frame, and processing the virtual model into a target three-dimensional effects model when a magnification stop condition is detected.

Figure 4:
FIG. 4 is a schematic diagram of processing the virtual effect into a target three-dimensional effect and fusing the target three-dimensional effect with a target object provided by an embodiment of the present disclosure.

An area occupied by the virtual model in the image to be processed can be used as the image area of the virtual model. Magnifying the display can be to magnify the virtual model to a preset scale. For example, the image area is magnified by 10% each time, or the virtual model is magnified and displayed according to a preset time, for example by 10% every 50 ms. That is, the image area of the virtual model is magnified and displayed as a video frame in the video. The magnification stop condition can be understood as a condition that the image area is no longer magnified when a certain extent is reached. The virtual model corresponding to the magnification stop can refer to the content with identification 1 in FIG. 3. The target 3D effect model corresponds to the virtual model. For example, the 3D target effect model can be a big cat model as shown in FIG. 4. The big cat target 3D effect model is a model close to a real pet. A plurality of parts of the pet in the target 3D effect model are movable. For example, the pupils in the eyes can rotate, the eyes can be closed, and the tail can be wagged.

For example, based on the presentation video frame, the image area corresponding to the virtual model can be determined and magnified for display. During the process of magnifying the image area, if it is detected that the image area reaches the magnification stop condition, the target 3D effects model corresponding to the virtual model can be determined.

It is noteworthy that the virtual effects of multiple pets and the target three-dimensional effects corresponding to the virtual effects can be pre-stored in the server, which can be set according to actual needs in practical application.

S130: fusing the target 3D effect model and the target object in the image to be processed to present the target video frame.

The target presentation video frame can be a video frame obtained by presenting the target 3D effects to the target object on the image to be processed. The image to be processed can be a captured object, e.g., the user, who can be the target object in the image to be processed. The fusing can be the effect of fusing the target 3D effects model to the target object, so that the target 3D effects model matches the target object. With reference to FIG. 4, the fusing can be the target object holding the target 3D effects model.

For example, after obtaining the target 3D model, the target 3D model can be fused with the target object to obtain the final displayed target video frame. At this time, the presentation video frame corresponding to the magnification stop condition can be directly jumped to the target video frame, that is, there is a situation where the video screen jumps.

It can be understood that when recording a video, if the effects display function is triggered, the image in the target scene can be captured, that is, the open-screen panoramic effect. At this time, virtual effects can be added. For example, the kitten effect, that is, the AR virtual effect shown in FIG. 2, can magnify and display the image area corresponding to the AR effect. The magnified display can be to magnify the AR effect itself, or to push the AR effect into the shot, or to focus and push the AR effect, that is, to focus on the kitten effect and obtain the video frame shown in FIG. 3. When the magnification stop condition is detected, the target three-dimensional effect corresponding to the AR effect can be determined, that is, the target three-dimensional effect can be fused with the target object to obtain and present the target video frame, as shown in FIG. 4.

With the technical solution of the embodiments of the present disclosure, when the trigger of an effect display function is detected, a virtual model can be added to the collected image to be processed to obtain a presentation video frame, and the image area of the virtual model in the presentation video frame is magnified and displayed, and when it is detected that the magnification stop condition is reached, the virtual model is processed into a target three-dimensional effect model, and the target three-dimensional effect model and the target object in the image to be processed are fused and processed to obtain a final displayed video frame. Thereby, the richness of the video picture and the interest of the video content are increased, and further the user experience is improved.

FIG. 5 is a schematic flowchart of a method for image processing provided by a further embodiment of the present disclosure. Based on the foregoing embodiment, "adding a virtual model to the collected image to be processed to obtain a presentation video frame", "magnifying and displaying the image area of the virtual model in the presentation video frame", and "fusing the target three-dimensional effects model and the target object in the image to be processed to present the target video frame" can be further refined. Specific implementation thereof can refer to the detailed description of this technical solution. Technical terms that are the same as or corresponding to those in the above embodiment are not repeated here.

As shown in FIG. 5, the method comprises:

S210: when the trigger of the effect display function is detected, adding a virtual model to the collected image to be processed to obtain a presentation video frame.

In this embodiment, the trigger of the effect display function comprises at least one of the following conditions: detecting that the collected image to be processed includes a target posture information; detecting the trigger of the effect display button.

In the scene of video capturing or live streaming, the image to be processed including the target object can be collected in real time, and it can be determined whether the target object in the image to be processed is target posture information. The target posture information is used for triggering the effects display. For example, the target posture information can be a pout, specific gestures, etc. For example, specific gestures can be fist-clenching gestures, palm-facing gestures, etc. If the posture information of the target object in the image to be processed is detected as the target posture information, it is considered that the effects display function has been triggered. Another way can be the effects display button on the display interface. If the user triggers the effects display button, it can be understood that corresponding effects need to be added to the target object in the image to be processed.

That is, in practical applications, the posture information of the target object can be detected in real time or at intervals, and where it is detected that the posture information of the target object is consistent with preset posture information, or when the effect display button on the display interface is triggered, it can be considered that target effects need to be added to the target object. The target effect can be a virtual model.

In this embodiment, when the trigger of the effect display function is detected, a virtual model may be added to the target object, i.e., adding effects. For example, the adding a virtual model to the collected image to be processed to obtain a presentation video frame comprises: adding the virtual model to the image to be processed at a position to be presented corresponding to the target object to obtain the presentation video frame.

The position to be presented can be any position of the target object's body. For example, the position to be presented can be on the hand, arm, shoulder, head, etc. The position to be presented can also be a position corresponding to the target posture information. For example, the target posture information is gesture information, and the position to be presented can be fingers, palms, etc. After adding the virtual model to the position to be presented in the image to be processed, the obtained image is used as the presentation video frame.

For example, after detecting that the button for displaying the effect function is triggered, the determined virtual model can be added to the position to be presented in the image to be processed corresponding to the target object, thereby obtaining a video frame for adding a virtual model to the target object.

For example, continue to refer to FIG. 2. The position to be presented is the palm. After detecting that the effect display function is triggered, the virtual model can be added to the palm of the target object, and then the image processing of the virtual model on the palm can be magnified. For example, the magnification processing can be to magnify the virtual model or push the shot closer to magnify the image area corresponding to the virtual model, so that the user can appreciate the magnified image of the virtual model. See FIG. 3 for a schematic diagram of the magnified image area of the virtual model.

In this embodiment, the adding the virtual model to the collected image to be processed to obtain a presentation video frame comprises: if the target object in the image to be processed is target gesture information, adding the virtual model to a part corresponding to the target posture information to obtain the presentation video frame.

If the target object in the image to be processed triggers the target posture information, it indicates that effects need to be added to the target object in the image to be processed. The target posture information can be a specific posture, such as arm forward and palm up, or the target posture can be a pout posture, etc. At this time, adding a virtual model to the target object can be either adding the virtual model to the palm or to the pouting mouth.

For example, if it is determined based on the target posture that the image display function is triggered, the target posture information can be determined, and the virtual model can be added to the position to be presented corresponding to the target posture information. For example, if the target posture is a pouting posture, the virtual model can be added to the mouth; if the target posture information is a palm-up posture, the virtual model can be added to the palm.

S220: gradually magnifying the image area of the virtual model in the presentation video frame for display.

Gradual magnification can be understood as if the starting image scale is 30% and the ending image scale is 100%. The image can be magnified according to the scale of one percent each time, which can be understood as gradual magnification. Of course, in order to achieve the best magnification effect, gradual magnification can be a single magnification of 30% to 50%.

For example, the image area of the virtual model displayed in the video frame can be gradually magnified. The gradual magnification can be scaled up, e.g., by 20% on the basis of the previous magnification.

S230: when the magnification stop condition is detected, processing the virtual model into a target three-dimensional effects model.

In this embodiment, the processing the virtual model into a target three-dimensional effects model when the magnification stop condition is detected comprises: if it is detected that a magnification duration of the virtual model reaches a preset magnification duration threshold, processing the virtual model into a target three-dimensional effects model; or, if it is detected that the magnification scale of the virtual model reaches a preset magnification scale threshold, processing the virtual model into a target three-dimensional effects model.

The preset magnification duration threshold is set in advance, for example, the magnification duration threshold can be 1 second. The target three-dimensional effect model is a model corresponding to the virtual model. The virtual model is the an effect model, and the target three-dimensional effect model is the AR physical object corresponding to the AR effect model. The AR physical object can be a static model or a dynamic model. The static model can be a standing object of the AR physical object, which can be a physical object corresponding to the virtual model. For example, the virtual model is an AR pet model, and the AR physical object can be a pet physical object. The dynamic model can be a model that the AR pet can move, just like a real pet. It is noteworthy that the virtual model can be any virtual model, without limitation to pet models. The preset magnification scale threshold is set in advance, that is, the maximum magnification scale. For example, the preset magnification scale threshold is 300%. If the magnification scale of the image area reaches the preset magnification scale threshold, the magnification can be stopped.

For example, when magnifying the image area of a virtual model, the image area can be gradually magnified, and the actual magnification duration can be recorded during the magnification process. When the actual magnification duration reaches a preset magnification duration threshold, it indicates that the virtual model needs to be processed into a target 3D effects model. Of course, it can also be recorded during the gradual magnification of the image area, and when the magnification scale reaches the preset magnification scale threshold, it indicates that the virtual model needs to be processed into a target 3D effect.

S240: placing the target three-dimensional effect model at a target presentation position of the target object in the image to be processed, obtaining the target video frame, and presenting the target video frame.

The target presentation position can be any position preset on the target image. For example, if the image to be processed includes a table, floor, etc., the table and floor can be used as the target presentation position. The target position can also be any position preset on the target object, such as shoulders or arms.

For example, the target 3D effect model can be placed at the target presentation position of the target object preset in the image to be processed, so as to obtain the target video frame and present the target video frame. Alternatively, the target 3D effect can be placed at any position displayed on the image to be processed. For example, if the virtual effect is a bird effect, the target 3D effect corresponding to the bird effect can be displayed at the sky in the image to be processed. The target object can be a user, pet, or any subject.

For example, the virtual effect is a kitten AR effect, and the target three-dimensional effect is an AR physical big cat. When the image area corresponding to the kitten AR effect is magnified-displayed, and when the magnification stop condition is detected, the AR physical big cat can be determined. The big cat is a dynamic effect, which is the same as the real cat, and its paws, tail, eyes, mouth, etc. can all move. The big cat physical effect can be placed in the arms of the target object. At the same time, the target object can hold the big cat and use the video frame obtained at this time as the presentation video frame, with reference to FIG. 4.

In this embodiment, presenting the target video frame comprises: transitioning a video frame corresponding to the magnification stop condition to the target video frame by means of preset animation effects, so as to present the target video frame.

The preset animation effects can be effects of inserting video frames, effects of inserting transition images, or virtual effects.

For example, after determining the target video frame, the video frame corresponding to the magnification stop condition can directly jump to the target video frame to present the target video frame.

With the technical solution of the embodiments of the present disclosure, when the trigger of an effect display function is detected, a virtual model can be added to the collected image to be processed, and the image area corresponding to the virtual model is magnified-displayed. When it is detected that the magnification stop condition is reached, the virtual model can be processed into a target three-dimensional effect model, and the target three-dimensional effect model and the target object in the image to be processed are fused and processed to obtain a target effect image. In this way, the situation in the related art that the effect is relatively simple and the picture richness is relatively poor can be avoided, and the richness of the effect picture can be enhanced. Further, the presented video picture is more attractive to users, and the user experience is improved.

FIG. 6 is a schematic diagram of structure of an apparatus for image processing provided in the present disclosure embodiments, shown in FIG. 6, the apparatus comprising: a determining module of presentation video 310, a determining module of three-dimensional effect 320 and a determining module of target video frame 330.

Herein, the determining module of presentation video is configured for in response to determining that the trigger of an effect display function is detected, adding a virtual model to a collected image to be processed to obtain a presentation video frame; a determining module of three-dimensional effect is configured for magnifying-displaying an image area of the virtual model in the presentation video frame, and processing the virtual model into a target three-dimensional effect model in response to determining that a magnification stop condition is reached; a determining module of target video frame, is configured for fusing the target three-dimensional effect model and a target object in the image to be processed to present a target video frame Based on the above technical solution, the trigger of an effect display function comprises at least one of the following conditions: detecting that the collected image to be processed comprises target posture information; detecting that an effect display button is triggered.

Based on the above technical solution, the determining module of presentation video is configured for adding the virtual model to a position to be presented corresponding to a target object in the image to be processed to obtain the presentation video frame.

Based on the above technical solution, the determining module of presentation video is configured for in response to determining that a target object in the image to be processed is target posture information, adding the virtual model to a part corresponding to the target posture information to obtain the presentation video frame.

Based on the above technical solution, the determining module of three-dimensional effect is configured for gradually magnifying-displaying the image area of the virtual model in the presentation video frame.

Based on the above technical solution, the determining module of three-dimensional effect is configured for processing the virtual model into a target three-dimensional effect model in response to determining that a magnification duration of the virtual model reaches a preset magnification duration threshold; or processing the virtual model into a target three-dimensional effect model in response to determining that a magnification scale of the virtual model reaches a preset magnification scale threshold.

Based on the above technical solution, the determining module of target video frame is configured for:

placing the target three-dimensional effect model at a target presentation position of a target object in the image to be processed to obtain the target video frame and present the target video frame.

Based on the above technical solution, the determining module of target video frame is configured for:

transitioning from a video frame corresponding to the magnification stop condition to the target video frame by means of preset animation effects to present the target video frame.

Based on the above technical solution, the virtual model is an augmented reality AR effect model, the target three-dimensional effect model is an AR physical object corresponding to the AR effect model, and the target three-dimensional effect model is one of a static model and a dynamic model.

The technical solution of the disclosed embodiment, when the trigger effect display function is detected, a virtual model may be added to the acquired image to be processed to obtain a presentation video frame, and the image area of the virtual model in the presentation video frame is enlarged and displayed, and it is detected that when the stop amplification condition is reached, the virtual model is processed into a target three-dimensional effect model, and the target three-dimensional effect model and the target object in the image to be processed are fused and processed to obtain a video frame that displays the target display, which improves the richness of the video picture and the interest of the video content, thereby improving the user experience.

The image processing apparatus provided in the present disclosure may perform any embodiment of the image processing method provided in the present disclosure, the method includes performing the corresponding functional modules and beneficial effects.

It is noted that the plurality of units and modules included in the above apparatus are only divided according to the functional logic, but is not limited to the above division, as long as the corresponding function may be achieved; Further, the specific names of the plurality of functional units are only for ease of distinction from each other, not intended to limit the scope of the disclosed embodiments.

Figure 7:
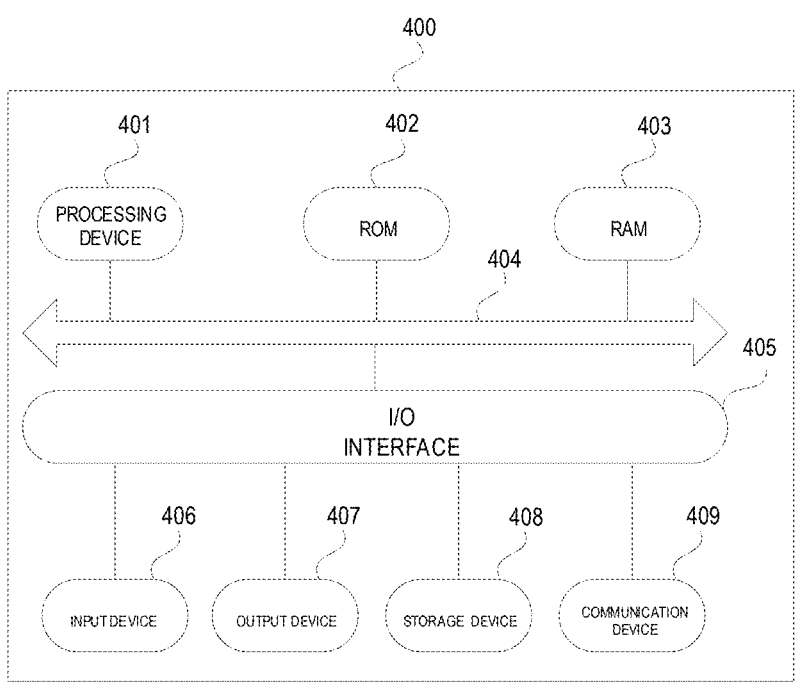
FIG. 7 is a schematic structural diagram of an electronic device provided by an embodiment of the present disclosure.

FIG. 7 is a schematic diagram of the structure of an electronic device provided in the present disclosure embodiment. In the following, reference is now made to FIG. 7, it shows a schematic diagram of the structure of an electronic device (such as a terminal device or server in FIG. 7) 400 suitable for implementing the present disclosure embodiment. The terminal device in the present disclosure embodiment may include but is not limited to mobile terminal device such as a mobile phone, laptops, digital broadcast receiver, personal digital assistant (PDA), tablet computer (PAD), portable multimedia player (PMP), car-mounted terminal device (such as car navigation end point), etc., and fixed terminal device such as digital TV, desktop computer, etc. The electronic device shown in FIG. 7 is only an example and should not bring any limitation on the function and scope of use of the present disclosure embodiment.

As shown in FIG. 7, the electronic device 400 may include a processing device (such as a central processor, graphics processing unit, etc.) 401, which may perform various appropriate actions and processes based on programs stored in read-only memory (ROM) 402 or loaded from storage device 406 into random access memory (RAM) 403. In RAM 403, various programs and data required for the operation of the electronic device 400 are also stored. The processing devices 401, ROM 402, and RAM 403 are connected to each other through a bus 404. The edit/output (I/O) interface 405 is also connected to the bus 404.

Typically, the following devices may be connected to the I/O interface 405: editing device 406, including a touch screen, touchpad, keyboard, mice, camera, microphone, accelerometer, gyroscope, etc.; output device 407, including liquid crystal display (LCD), speaker, vibrator, etc.; storage device 406, including magnetic tape, hard disk, etc.; and communication device 409. Communication device 409 may allow electronic device 400 to communicate wirelessly or wirelessly with other device(s) to exchange data. Although FIG. 7 shows an electronic device 400 with multiple devices, it should be understood that it is not required to implement or have all of the devices shown. More or fewer devices may be implemented or provided instead.

According to embodiments of the present disclosure, the processes described above with reference to the drawings may be implemented as a computer software program. For example, embodiments of the present disclosure include a computer program product comprising a computer program carried on a non-transitory computer-readable medium, the computer program comprising program code for performing the method shown in the flowchart. In such embodiments, the computer program may be downloaded and installed from the network via the communication device 409, or installed from the storage device 406, or from the ROM 402. When the computer program is executed by the processing device 401, the above-described functions defined in the method of the present disclosure are performed.

The names of the messages or information exchanged between multiple devices in this public implementation are for illustrative purposes only and are not intended to limit the scope of these messages or information.

The electronic devices provided in the present disclosure and the image processing methods provided in the above embodiments belong to the same concept, technical details not described in detail in the present embodiment may refer to the above embodiment, and the present embodiment has the same beneficial effects as the above embodiments.

The present disclosure provides a computer storage medium having stored a computer program thereon, and the image processing method of the above embodiment is implemented when the program is executed by a processor provided.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, clients and servers may communicate by using any currently known or future developed network protocol, such as, Hyper Text Transfer Protocol (HTTP), and may interconnect with any form or medium of digital data communication (such as communication networks). Examples of communication networks include a local area network (LAN), wide area network (WAN), the extranet (such as the Internet), and peer to peer network (such as ad hoc peer to peer network), as well as any currently known or future developed networks.

The computer-readable medium may be included in the electronic device described above; or it may stand alone without being assembled into the electronic device.

The computer-readable medium carries at least one program, and the at least one program described above, when executed by the electronic device, causes the electronic device to:

in response to determining that the trigger of an effect display function is detected, add a virtual model to a collected image to be processed to obtain a presentation video frame;

magnifying-display an image area of the virtual model in the presentation video frame, and process the virtual model into a target three-dimensional effect model in response to determining that a magnification stop condition is reached;

fuse the target three-dimensional effect model and a target object in the image to be processed to present a target video frame.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or may be implemented by the combination of dedicated hardware and computer instructions.

The modules described in the disclosed embodiments may be implemented by means of software or by means of hardware, wherein the name of the module does not constitute a limitation on the unit itself under certain circumstances, for example, the first acquisition module may also be described as "a module that acquires at least two Internet protocol addresses".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more of embodiments of the present discourse, [the embodiment 1] provides a method for image processing, comprising:

in response to determining that the trigger of an effect display function is detected, adding a virtual model to a collected image to be processed to obtain a presentation video frame;

magnifying-displaying an image area of the virtual model in the presentation video frame, and processing the virtual model into a target three-dimensional effect model in response to determining that a magnification stop condition is reached;

fusing the target three-dimensional effect model and a target object in the image to be processed to present a target video frame.

According to one or more of embodiments of the present discourse, [the embodiment 2] provides a method for image processing, the method further comprising:

for example the trigger of an effect display function comprises at least one of the following conditions:

detecting that the collected image to be processed comprises target posture information;

detecting that an effect display button is triggered.

According to one or more of embodiments of the present discourse, [the embodiment 3] provides a method for image processing, the method further comprising:

for example, adding a virtual model to the collected image to be processed to obtain a presentation video frame comprises:

adding the virtual model to a position to be presented corresponding to a target object in the image to be processed to obtain the presentation video frame.

According to one or more of embodiments of the present discourse, [the embodiment 4] provides a method for image processing, the method further comprising:

for example, adding a virtual model to the collected image to be processed to obtain a presentation video frame comprises:

in response to determining that a target object in the image to be processed is target posture information, adding the virtual model to a part corresponding to the target posture information to obtain the presentation video frame.

According to one or more of embodiments of the present discourse, [the embodiment 5] provides a method for image processing, the method further comprising:

for example, magnifying-displaying an image area of the virtual model in the presentation video frame comprises:

gradually magnifying-displaying the image area of the virtual model in the presentation video frame.

According to one or more of embodiments of the present discourse, [the embodiment 6] provides a method for image processing, the method further comprising:

for example, processing the virtual model into a target three-dimensional effect model in response to determining that a magnification stop condition is reached comprises:

processing the virtual model into a target three-dimensional effect model in response to determining that a magnification duration of the virtual model reaches a preset magnification duration threshold; or, processing the virtual model into a target three-dimensional effect model in response to determining that a magnification scale of the virtual model reaches a preset magnification scale threshold.

According to one or more of embodiments of the present discourse, [the embodiment 7] provides a method for image processing, the method further comprising:

for example, fusing the target three-dimensional effect model and a target object in the image to be processed to present a target video frame comprises:

placing the target three-dimensional effect model at a target presentation position of a target object in the image to be processed to obtain the target video frame and present the target video frame.

According to one or more of embodiments of the present discourse, [the embodiment 8] provides a method for image processing, the method further comprising:

for example, presenting the target video frame comprises:

transitioning from a video frame corresponding to the magnification stop condition to the target video frame by means of preset animation effects to present the target video frame.

According to one or more of embodiments of the present discourse, [the embodiment 9] provides a method for image processing, the method further comprising:

for example, virtual model is an augmented reality AR effect model, the target three-dimensional effect model is an AR physical object corresponding to the AR effect model, and the target three-dimensional effect model is one of a static model and a dynamic model.

According to one or more of embodiments of the present discourse, [the embodiment 10] provides an apparatus for image processing, the apparatus comprising:

a determining module of presentation video, configured for in response to determining that the trigger of an effect display function is detected, adding a virtual model to a collected image to be processed to obtain a presentation video frame;

a determining module of three-dimensional effect, configured for magnifying-displaying an image area of the virtual model in the presentation video frame, and processing the virtual model into a target three-dimensional effect model in response to determining that a magnification stop condition is reached;

a determining module of target video frame, configured for fusing the target three-dimensional effect model and a target object in the image to be processed to present a target video frame.

In addition, although various operations are depicted in a specific order, it should not be understood as requiring such operations to be performed in the specific order shown or in a sequential order. Under given conditions, multi-task processing and parallel processing may be advantageous. Similarly, although details of several specific implementations are included in the foregoing discussion, these details should not be construed as a limitation to the scope of the present disclosure. Some features described in the context of individual embodiments may also be implemented in a single embodiment in combination. On the contrary, various features described in the context of a single embodiment may also be implemented in a plurality of embodiments separately or in any suitable sub-combination.

What is claimed is:

1. A method for image processing, comprising:

in response to determining that a trigger of an effect display function is detected, adding a virtual model to a collected image to obtain a presentation video frame, wherein the effect display function is triggered based on posture information of an object in the image, and a position to be presented of the virtual model in the presentation video frame is corresponding to the posture information;

magnifying-displaying an image area of the virtual model in the presentation video frame, and processing the virtual model into a three-dimensional effect model in response to determining that a magnification stop condition is reached, wherein the virtual model is a virtual effect model, the three-dimensional effect model is a virtual physical object corresponding to the virtual effect model, and the three-dimensional effect model is different from the virtual model; and fusing the three-dimensional effect model and the object in the image to present a video frame.

2. The method according to claim 1, wherein the trigger of an effect display function comprises at least one of the following conditions:

detecting that the collected image comprises the posture information; or detecting that an effect display button is triggered.

3. The method according to claim 1, wherein adding a virtual model to the collected image to obtain a presentation video frame comprises:

adding the virtual model to a position to be presented corresponding to the object in the image to obtain the presentation video frame.

4. The method according to claim 1, wherein adding a virtual model to the collected image to obtain a presentation video frame comprises:

in response to determining that the object in the image is the posture information, adding the virtual model to a part corresponding to the posture information to obtain the presentation video frame.

5. The method according to claim 1, wherein magnifying-displaying an image area of the virtual model in the presentation video frame comprises:

gradually magnifying-displaying the image area of the virtual model in the presentation video frame.

6. The method of claim 1, wherein processing the virtual model into a three-dimensional effect model in response to determining that a magnification stop condition is reached comprises:

processing the virtual model into a three-dimensional effect model in response to determining that a magnification duration of the virtual model reaches a preset magnification duration threshold; or processing the virtual model into a three-dimensional effect model in response to determining that a magnification scale of the virtual model reaches a preset magnification scale threshold.

7. The method according to claim 1, wherein fusing the three-dimensional effect model and the object in the image to present a video frame comprises:

placing the three-dimensional effect model at a presentation position of the object in the image to obtain the video frame and present the video frame.

8. The method of claim 7, wherein presenting the target video frame comprises:

transitioning from a video frame corresponding to the magnification stop condition to the video frame by means of preset animation effects to present the video frame.

9. The method according to claim 1, wherein virtual model is an augmented reality AR effect model, the three-dimensional effect model is an AR physical object corresponding to the AR effect model, and the three-dimensional effect model is one of a static model and a dynamic model.

10. An electronic device, comprising:

a processor;

a memory, configured to store a computer program;

wherein the computer program, when executed by the processor, causes the electronic device to perform operations comprising:

in response to determining that a trigger of an effect display function is detected, adding a virtual model to a collected image to obtain a presentation video frame, wherein the effect display function is triggered based on posture information of an object in the image, and a position to be presented of the virtual model in the presentation video frame is corresponding to the posture information;

magnifying-displaying an image area of the virtual model in the presentation video frame, and processing the virtual model into a three-dimensional effect model in response to determining that a magnification stop condition is reached, wherein the virtual model is a virtual effect model, the three-dimensional effect model is a virtual physical object corresponding to the virtual effect model, and the three-dimensional effect model is different from the virtual model; and fusing the three-dimensional effect model and the object in the image to present a video frame.

11. A non-transitory computer-readable storage medium, wherein the computer readable-storage medium stores instructions which, when executed on an electronic device, cause the electronic device to perform operations comprising:

in response to determining that a trigger of an effect display function is detected, adding a virtual model to a collected image to obtain a presentation video frame, wherein the effect display function is triggered based on posture information of an object in the image, and a position to be presented of the virtual model in the presentation video frame is corresponding to the posture information;

magnifying-displaying an image area of the virtual model in the presentation video frame, and processing the virtual model into a three-dimensional effect model in response to determining that a magnification stop condition is reached, wherein the virtual model is a virtual effect model, the three-dimensional effect model is a virtual physical object corresponding to the virtual effect model, and the three-dimensional effect model is different from the virtual model; and fusing the three-dimensional effect model and the object in the image to present a video frame.

12. The electronic device according to claim 10, wherein the trigger of an effect display function comprises at least one of the following conditions:

detecting that the collected image comprises the posture information; or detecting that an effect display button is triggered.

13. The electronic device according to claim 10, wherein adding a virtual model to the collected image to obtain a presentation video frame comprises:

adding the virtual model to a position to be presented corresponding to the object in the image to obtain the presentation video frame.

14. The electronic device according to claim 10, wherein adding a virtual model to the collected image to obtain a presentation video frame comprises:

in response to determining that the object in the image is the posture information, adding the virtual model to a part corresponding to the posture information to obtain the presentation video frame.

15. The electronic device according to claim 10, wherein magnifying-displaying an image area of the virtual model in the presentation video frame comprises:

gradually magnifying-displaying the image area of the virtual model in the presentation video frame.

16. The electronic device according to claim 10, wherein processing the virtual model into a three-dimensional effect model in response to determining that a magnification stop condition is reached comprises:

processing the virtual model into a three-dimensional effect model in response to determining that a magnification duration of the virtual model reaches a preset magnification duration threshold; or processing the virtual model into a three-dimensional effect model in response to determining that a magnification scale of the virtual model reaches a preset magnification scale threshold.

17. The electronic device according to claim 10, wherein fusing the three-dimensional effect model and the object in the image to present a video frame comprises:

placing the three-dimensional effect model at a presentation position of the object in the image to obtain the video frame and present the video frame.

18. The electronic device according to claim 10, wherein presenting the video frame comprises:

transitioning from a video frame corresponding to the magnification stop condition to the video frame by means of preset animation effects to present the video frame.

19. The electronic device according to claim 10, wherein virtual model is an augmented reality AR effect model, the three-dimensional effect model is an AR physical object corresponding to the AR effect model, and the three-dimensional effect model is one of a static model and a dynamic model.

20. The non-transitory computer-readable storage medium according to claim 11, wherein the trigger of an effect display function comprises at least one of the following conditions:

detecting that the collected image comprises the posture information; or detecting that an effect display button is triggered.

\* \* \* \* \*